Jan. 13, 1931.  L. S. SHELDRICK  1,788,692
AUTOMOBILE STEERING COLUMN
Filed April 16, 1930
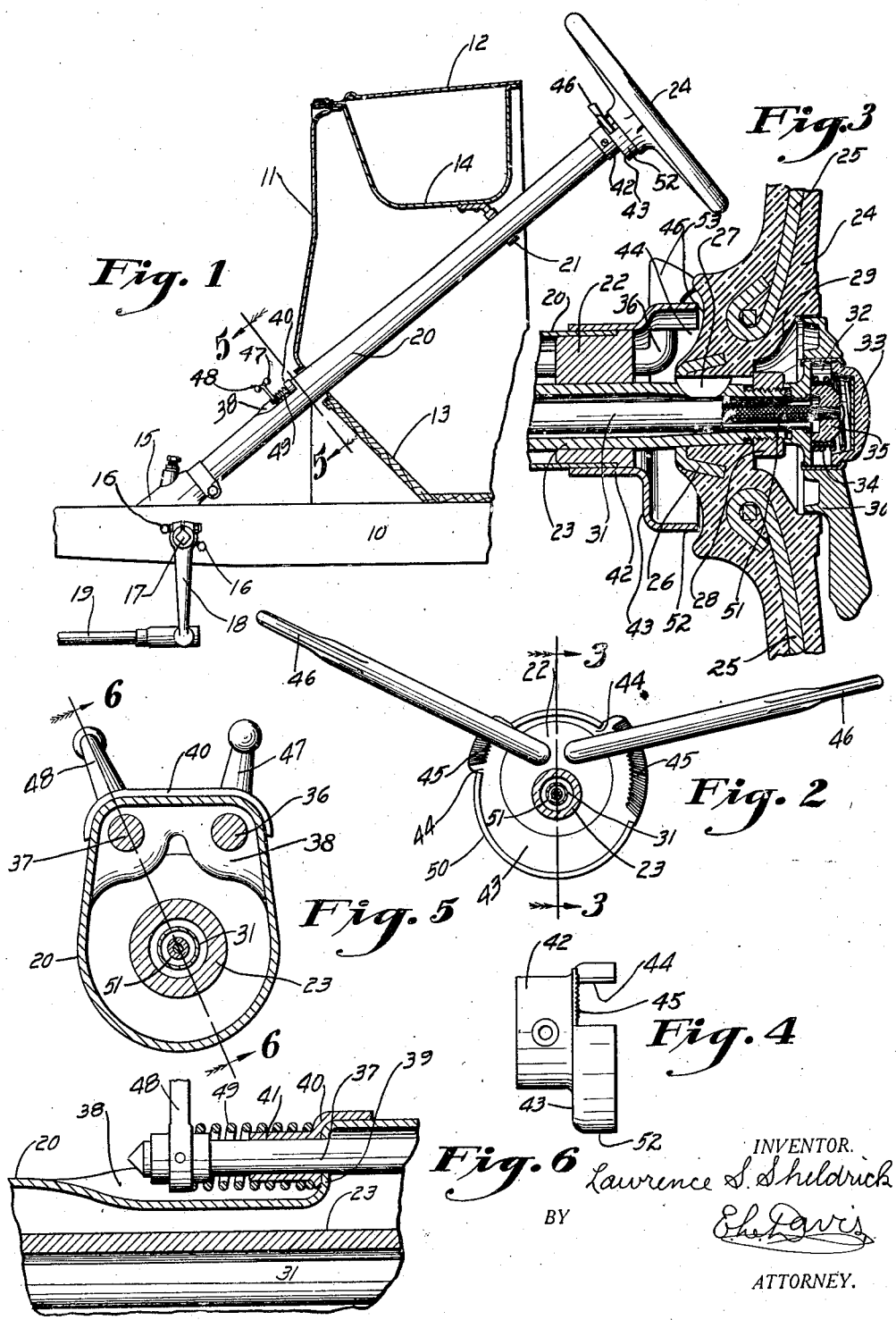
INVENTOR.
Lawrence S. Sheldrick
BY
ATTORNEY.

Patented Jan. 13, 1931

1,788,692

UNITED STATES PATENT OFFICE

LAWRENCE S. SHELDRICK, OF DETROIT, MICHIGAN, ASSIGNOR TO FORD MOTOR COMPANY, OF DEARBORN, MICHIGAN, A CORPORATION OF DELAWARE

AUTOMOBILE STEERING COLUMN

Application filed April 16, 1930. Serial No. 444,668.

The object of my invention is to provide an automobile steering column of simple, durable, and inexpensive construction.

A further object of my invention is to provide an automobile steering column of tubular section in which a steering shaft and a pair of control rods are rotatably mounted. I, of course, provide a steering wheel fastened to the upper end of the steering shaft and also provide control levers for the control rods, these levers extending outwardly beneath the steering wheel. A garnish flange is secured to the upper end of the steering column which hides from view the joint between the wheel and the shaft and which also has a pair of quadrants formed thereon to co-act with the control levers. A feature of this device is that I flatten out portions of the garnish flange to form the quadrants leaving shoulders on the flange which form stops to limit the movement of the control levers.

A further object of my invention is to provide means whereby the lower ends of the spark and throttle control rods may project from the wall of the steering column just forwardly of the dash so that they may be more readily connected to the distributor and carburetor, respectively. Heretofore, spark and throttle control rods have been provided in the form of concentric tubes extending inside of a tubular steering gear shaft having a steering wheel secured to its upper end. The lower end of this shaft was coupled to the steering gear reduction so that it was necessary to run these tubes the full length of the steering gear shaft, the result being that the exposed ends of the tubes were very inconveniently situated for connecting with the distributor and carburetor.

To obtain the necessary rigidity for the steering wheel, and to totally enclose the steering mechanism, it has been found very desirable to provide a continuous column from the steering wheel directly to the steering gear mechanism. With such a steering column, engineers were obliged to enclose the spark and throttle control rods within the steering tube as just described. In my improved device these rods are totally enclosed within the steering column and yet project out through the wall of the column at a point where it is convenient to connect them to the distributor and carburetor. I am thus able to provide a steering column at considerably less cost and still retain all the advantages of the older type. The cost of the linkage connecting my device with the distributor and carburetor is also materially lessened.

With these and other objects in view my invention consists in the arrangement, construction, and combination of the various parts of my improved device, as described in the specification, claimed in my claims, and illustrated in the accompanying drawings, in which:

Figure 1 shows a side elevation of my improved steering column mounted on a chassis frame, part of the chassis being shown in section to better illustrate the construction.

Figure 2 shows a plan view of the upper end of the steering column shown in Figure 1 having the steering wheel removed.

Figure 3 shows a sectional view taken on the line 3—3 of Figure 2.

Figure 4 shows a detailed view of my improved garnish flange, illustrating the spark and throttle rod quadrants.

Figure 5 shows a sectional view taken on the line 5—5 of Figure 1, and

Figure 6 shows a sectional view taken on the line 6—6 of Figure 5.

Referring to the accompanying drawings, I have used the reference numeral 10 to indicate generally the frame member of an automobile having a dash 11, cowl 12, and floor boards 13. I have shown a fuel tank 14 formed integral with the cowl member 12 and to which the upper end of my steering column is secured. Other means may be provided, if desired, for mounting the upper end of this steering column as my invention resides not in the manner of mounting the column but in the actual structure thereof.

A steering gear housing 15 is secured by bolts 16 to the frame 10 and is provided with a worm wheel shaft 17 extending out through this frame to which an arm 18 is secured. A drag link 19 is fastened to the outer end of this arm and extends forwardly to the steering wheels of the car. The steering reduction is mounted within the housing 15 and may be any of a number of different type steering gear reductions. I have provided a steering column 20 of generally tubular cross section secured to the housing 15 and extending upwardly to the steering wheel of the car. The upper end of this steering column is supported by a bracket 21 which is riveted to the under side of the fuel tank 14.

Referring to Figure 3, a steering shaft bearing 22 is pressed into the upper end of the steering column 20 and supports the upper end of a steering gear shaft 23 which extends from the housing 15 up through the column 21 and bearing 22. I have shown a moulded steering wheel 24 having spoke reinforcements 25 and a hub reinforcing member 26 molded therein. The upper end of the steering shaft 23 is tapered and is provided with a Woodruff key 27 which coacts with a suitable keyway formed in the reinforcement 26 to securely lock the wheel and shaft together. Several keyways may be machined at various positions around the reinforcement 26 so that the position of the steering wheel on the shaft 23 may be varied to suit the individual preferences of the drivers. A nut 28 is threaded on the outer end of the steering shaft 23 to lock the steering wheel to the shaft.

The hub portion of the steering wheel 24 is provided with a recess 29 into which a light switch operating disk 30 is mounted. This disk is secured to the upper end of a tube 31 which extends down through the hollow shaft 23 and through the housing 15 where it emerges from the lower end thereof in position to operate a suitable light switch. The center portion of the disk 30 is recessed at 32 to receive a horn push button 33. This push button is held in its inoperative position by a spring 34, the lower end of which secures a terminal block 35 in the recess 32. A horn wire 51 extends through the tube 31 and is secured in the block 35 in position to co-act with the push button 33 to operate the horn.

I have thus provided a steering shaft having a light switch operating tube and horn switch wire extending therethrough. No particular difficulty is encountered in connecting up the horn wire or light switch wire, as these wires may extend along the frame member 10 to their various terminals.

The bearing 22 is provided with two openings spaced from the shaft 23 which receive a throttle control rod 36 and a distributor control rod 37. These rods 36 and 37 extend downwardly along side of the steering shaft 23 to position just forwardly of the dash member 11. At this point the steering column 20 is provided with a pair of depressions 38, illustrated in Figure 6, the upper wall 39 of these depressions being substantially perpendicular to the axis of the column so that the rods 36 and 37 may project outwardly through suitable openings in this wall 39. A reinforcing plate 40 is welded to this column 20 at this point and is provided with a pair of bearings 41 extending downwardly therefrom in which the rods 36 and 37 are rotatably mounted.

A sleeve 42 is secured to the upper end of the steering column 20 and a garnish flange 43 extends radially from this sleeve. A ring shaped garnish member 52 is formed integral with the outer edge of the flange 43 and extends upwardly to co-act with an annular convex depression 53 in the lower side of the steering wheel hub to thereby hide from view the joint between the steering wheel and shaft.

The upper ends of the rods 36 and 37 are bent outwardly at 46 to form control levers for these rods. Suitable portions of the ring 52 are blanked out at 44 to allow these control rod levers to extend therethrough, the edges of these blanked portions limiting the movement of these levers. The flange 43 adjacent to the blanked portions 44 is provided with serrations 45 which co-act with the under side of the control levers to thereby retain them in various positions.

I have provided arms 47 and 48 secured on the lower ends of the rods 36 and 37, respectively, these arms having ball ends which may conveniently be connected to the carburetor and distributor of the engine. Compression springs 49 are disposed between the re-inforcing member 40 and each of the arms 47 and 48 to resiliently urge the levers 46 against the serrations 45.

Among the many advantages arising from the use of my improved device it may be well to mention that I have provided a continuous tubular steering column extending from the steering gear housing to the steering wheel in which the steering gear shaft together with the spark and throttle control rods are housed. The lower ends of these rods project out through the wall of the tube in a novel manner so as to make unnecessary the use of concentric tubes for these control members, and so as to be in a better position for connection with the distributor and carburetor.

A further advantage results because I have provided a garnish strip for the upper end of the steering column which shields from view the joint between the steering wheel and the steering shaft, and which forms stops for limiting the movement of the spark and throttle control levers.

Some changes may be made in the arrangement, construction, and combination of the various parts of my improved device without departing from the spirit of my invention and it is my intention to cover by my claims such changes as may reasonably be included within the scope thereof.

I claim as my invention:

1. In a device of the character described, a tubular steering column, a steering shaft rotatably mounted in said steering column, a control rod rotatably mounted within said column and spaced from the axis of said shaft, and an offset portion formed in said column through which the lower end of said rod projects for the purpose described.

2. In a device of the character described, a steering gear housing, a tubular steering column secured to said housing, a steering shaft rotatably mounted in said steering column, a steering wheel secured to the upper end of said shaft, a pair of control rods rotatably mounted within said column axially spaced from said shaft, control levers formed on the upper ends of said rods extending radially beneath said wheel, and an offset portion formed in said column through which the lower ends of said rods project for the purpose described.

3. In a device of the character described, a steering gear housing, a tubular steering column secured to said housing, a steering shaft rotatably mounted in said steering column, a steering wheel secured to the upper end of said shaft, a pair of control rods rotatably mounted within said column axially spaced from said shaft, control levers formed on the upper ends of said rods extending radially beneath said wheel, and offset portion formed in said column through which the lower ends of said rods project, and a reinforcing member secured to the steering column over said offset portion providing bearings for the lower end of said rods.

4. In a device of the character described, a steering gear housing, a tubular steering column secured in said housing, a steering shaft rotatably mounted within said steering column, a steering wheel secured to the upper end of said shaft, a pair of control rods having their upper ends bent outwardly to form control levers rotatably mounted within said column, and an offset portion formed in the lower portion of said column through which the lower ends of said rods project for the purpose described.

5. In a device of the character described, a tubular steering column, a bearing block secured in the upper end of said column, a steering shaft having its upper end rotatably mounted in said block, a pair of control rods having their upper ends rotatably mounted in said block axially spaced from said shaft, an offset portion formed in the lower portion of said column through which the lower ends of said rods project, and a reinforcing member secured to said column adjacent to the offset portion providing bearings for the lower ends of said rods.

6. In a device of the character described, a tubular steering column having a steering shaft rotatably mounted therein, a control rod rotatably mounted in said column axially spaced from said shaft, a steering wheel secured to said shaft, a control lever secured to said rod extending radially beneath said wheel, and a flange secured to the end of said column adjacent to the steering wheel having a blanked out portion through which said lever projects, said flange effectively hiding from view the joint between the steering wheel and shaft.

7. In a device of the character described, a tubular steering column having a steering shaft rotatably mounted therein, a pair of control rods rotatably mounted in said column axially spaced from said shaft, a steering wheel secured to said shaft, a pair of control levers formed on the ends of said rods extending radially beneath said wheel, a garnish flange secured to the end of said column adjacent to the steering wheel having blanked out portions through which said levers project, and serrations formed in said flange adjacent to said blanked portions to form quadrants for said levers, the flange effectively hiding from view the joint between the steering wheel and shaft.

8. In a device of the character described, a steering column, a bearing block secured in the upper end of said column, a steering gear shaft rotatably mounted in said block, a pair of control rods rotatably mounted in said block axially spaced from said shaft, a steering wheel secured to the end of said shaft, control levers for said rods extending radially beneath said wheel, and a garnish flange secured to the end of said column adjacent to the steering wheel effectively hiding from view the joint between the wheel and shaft, said garnish flange having a pair of blanked portions therein through which said levers extend the edges of which form stops to limit the movement of said levers.

LAWRENCE S. SHELDRICK.